(12) United States Patent
Rich

(10) Patent No.: US 9,481,404 B1
(45) Date of Patent: Nov. 1, 2016

(54) CARGO BED COVER FOR A VEHICLE

(71) Applicant: Warren N. Rich, Waynesboro, PA (US)

(72) Inventor: Warren N. Rich, Waynesboro, PA (US)

( * ) Notice: Subject to any disclaimer, the term of this patent is extended or adjusted under 35 U.S.C. 154(b) by 0 days.

(21) Appl. No.: 14/627,551

(22) Filed: Feb. 20, 2015

Related U.S. Application Data

(60) Provisional application No. 61/976,150, filed on Apr. 7, 2014.

(51) Int. Cl.
| | |
|---|---|
| *B62D 33/00* | (2006.01) |
| *B62D 33/04* | (2006.01) |
| *B60P 7/04* | (2006.01) |
| *B62D 33/08* | (2006.01) |

(52) U.S. Cl.
CPC ............... *B62D 33/04* (2013.01); *B60P 7/04* (2013.01); *B62D 33/08* (2013.01)

(58) Field of Classification Search
CPC .......... B62D 33/04; B62D 33/08; B60P 7/04
USPC ................................................. 296/43, 26.05
See application file for complete search history.

(56) References Cited

U.S. PATENT DOCUMENTS

| | | | |
|---|---|---|---|
| 4,647,103 A | 3/1987 | Walblay | |
| 4,813,734 A | 3/1989 | Hoover | |
| 4,915,440 A | 4/1990 | Daniel et al. | |
| 5,002,329 A * | 3/1991 | Rafi-Zadeh | B60P 3/34 248/166 |
| 5,050,924 A | 9/1991 | Hansen | |
| 5,299,849 A | 4/1994 | Cook et al. | |
| 5,431,474 A | 7/1995 | Burkey | |
| 6,655,726 B2 * | 12/2003 | Bergeron | B60J 7/102 296/100.01 |
| 7,086,685 B1 | 8/2006 | Zeugner | |
| 7,147,265 B1 | 12/2006 | Schmeichel | |
| 7,735,898 B1 | 6/2010 | Bridges | |
| 8,146,981 B2 | 4/2012 | Huotari et al. | |

* cited by examiner

*Primary Examiner* — Joseph D Pape
(74) *Attorney, Agent, or Firm* — Robert C. Montgomery; Montgomery Patent & Design LP

(57) ABSTRACT

A cargo bed cover apparatus for a vehicle is disclosed. The apparatus includes a laterally opposed pair of first support post assemblies removably attachable to a cargo bed of the vehicle and a laterally opposed pair of second support post assemblies removably attachable to the cargo bed of the vehicle, the pair of second support assemblies being longitudinally opposed to the pair of first support post assemblies. The apparatus further includes a pair of side panels extending between and connected to longitudinally opposed pairs of the first support post assemblies and the second support post assemblies and a pair of end panels extending between and connected to the laterally opposed pairs of the first support post assemblies and the second support post assemblies.

15 Claims, 11 Drawing Sheets

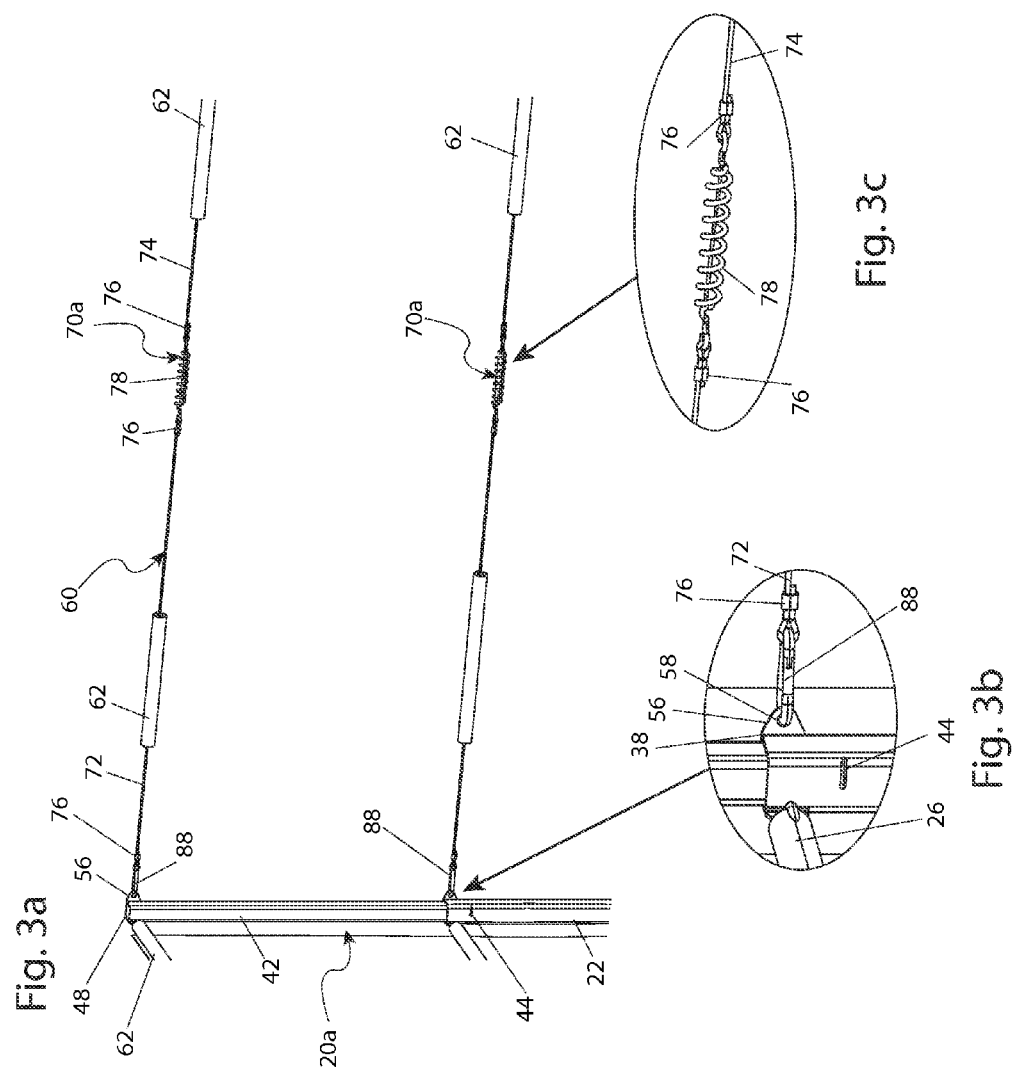

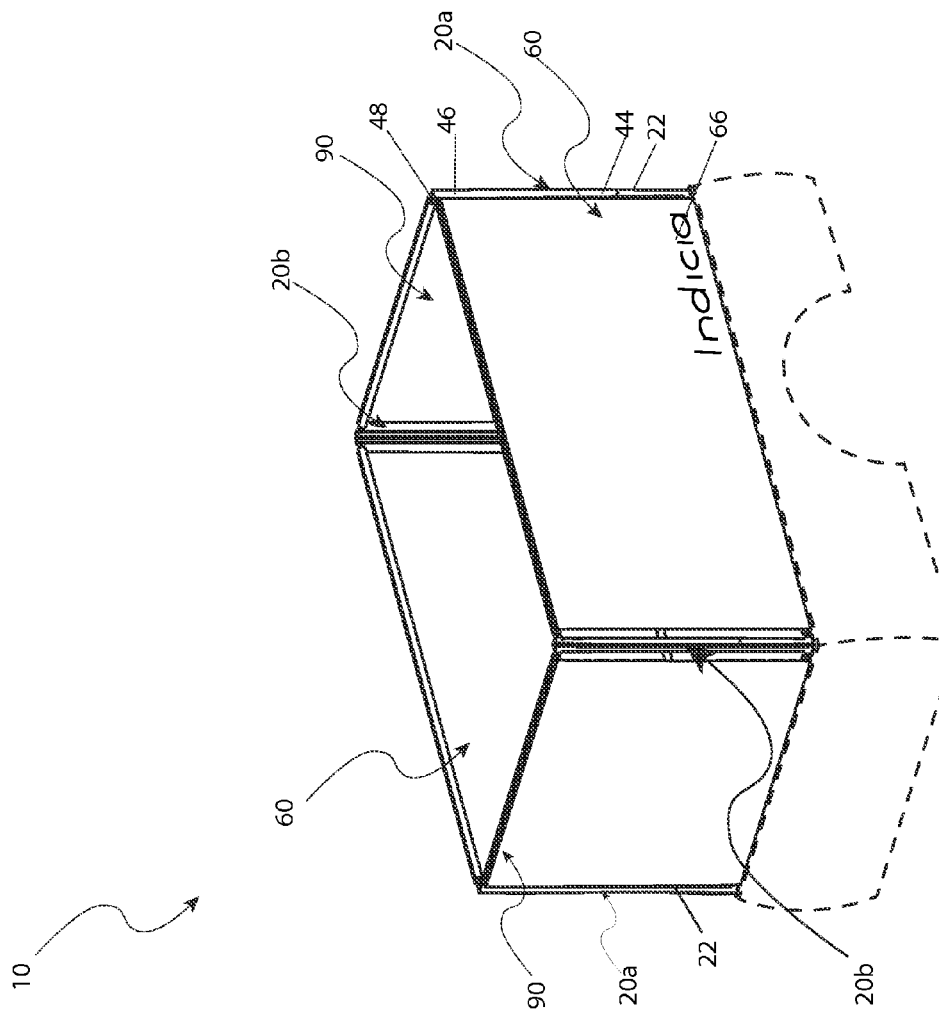

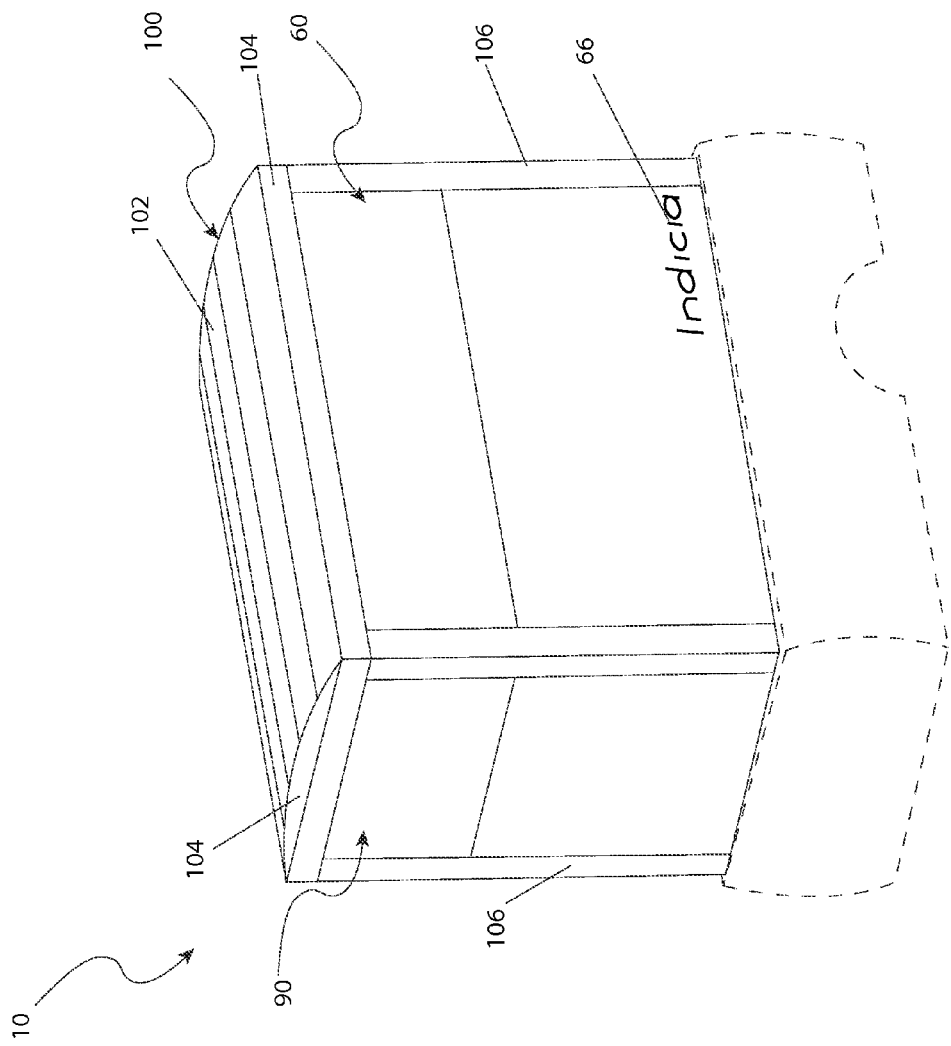

CARGO BED COVER FOR A VEHICLE

RELATED APPLICATIONS

The present invention is a continuation-in-part of, was first described in, and claims the benefit of U.S. Provisional Application No. 61/976,150, filed Apr. 7, 2014, the entire disclosures of which are incorporated herein by reference.

FIELD OF THE INVENTION

The present invention relates generally to vehicle cargo beds and, more particularly, to an adjustable cargo top configured to connect to and fit over a cargo bed of a vehicle, such as a pick-up truck.

BACKGROUND OF THE INVENTION

With sales at an all-time high, the popularity of the pick-up style truck as an everyday vehicle is more widespread than it ever has been. Their utility and convenience in hauling items coupled with the availability of luxury interiors and extended cab space have made the pickup a popular alternative to other vehicles. The availability of aftermarket accessories also enhances the attractiveness of pickup trucks as well.

Perhaps one (1) of the most common accessories is that of a truck cap, which covers and protects the entire cargo bed area. While such an accessory does wonders for protecting bed contents, it is basically a permanent change to the functionality of the truck. While it can be removed to return the truck bed to open air use, it is time consuming process to apply and remove, and often requires the help of one (1) or two (2) additional people. Finally, such bed caps are relatively expensive, especially if they are only really needed on an infrequent basis.

Accordingly, there exists a need for a means by which the functionality of a pickup truck cap can be provided in a manner which addresses the abovementioned shortcomings.

SUMMARY OF THE INVENTION

The inventor has recognized the aforementioned inherent problems and lack in the art and observed that there is a need for a cargo bed cover that provides pick-up truck owners all of the benefits of a conventional truck bed cap without the associated cost or disadvantages. The development of the present invention, which will be described in greater detail herein, substantially departs from conventional solutions to fulfill this need.

In one (1) embodiment, the disclosed cargo bed cover apparatus for a vehicle includes support post assemblies attachable to a cargo bed of the vehicle, and panels extending between and connected to the support posts.

In another embodiment, the disclosed cargo bed cover apparatus for a vehicle includes a laterally opposed pair of first support post assemblies removably attachable to a cargo bed of the vehicle, a laterally opposed pair of second support post assemblies removably attachable to the cargo bed of the vehicle, the pair of second support assemblies being longitudinally opposed to the pair of first support post assemblies, a pair of side panels extending between and connected to longitudinally opposed pairs of the first support post assemblies and the second support post assemblies, and a pair of end panels extending between and connected to the laterally opposed pairs of the first support post assemblies and the second support post assemblies.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 3*a* is a perspective view of an interior of a side panel of the disclosed cargo bed cover illustrating a first cable and a second cable attached to a tensioning spring, in accordance with one (1) embodiment of the present invention;

FIG. 3*b* is a perspective view of a spring clip of the interior of a side panel of FIG. 3*a*, in accordance with one (1) embodiment of the present invention;

FIG. 3*c* is a partial perspective view of the tensioning spring of the interior of a side panel of FIG. 3*a*, in accordance with one (1) embodiment of the present invention;

FIG. 4 is a perspective view of the disclosed cargo bed cover of FIG. 1 with an upper portion collapsed;

FIG. 5 is a perspective view of the disclosed cargo bed cover, in accordance with one (1) embodiment of the present invention;

DESCRIPTIVE KEY

Figure 1:
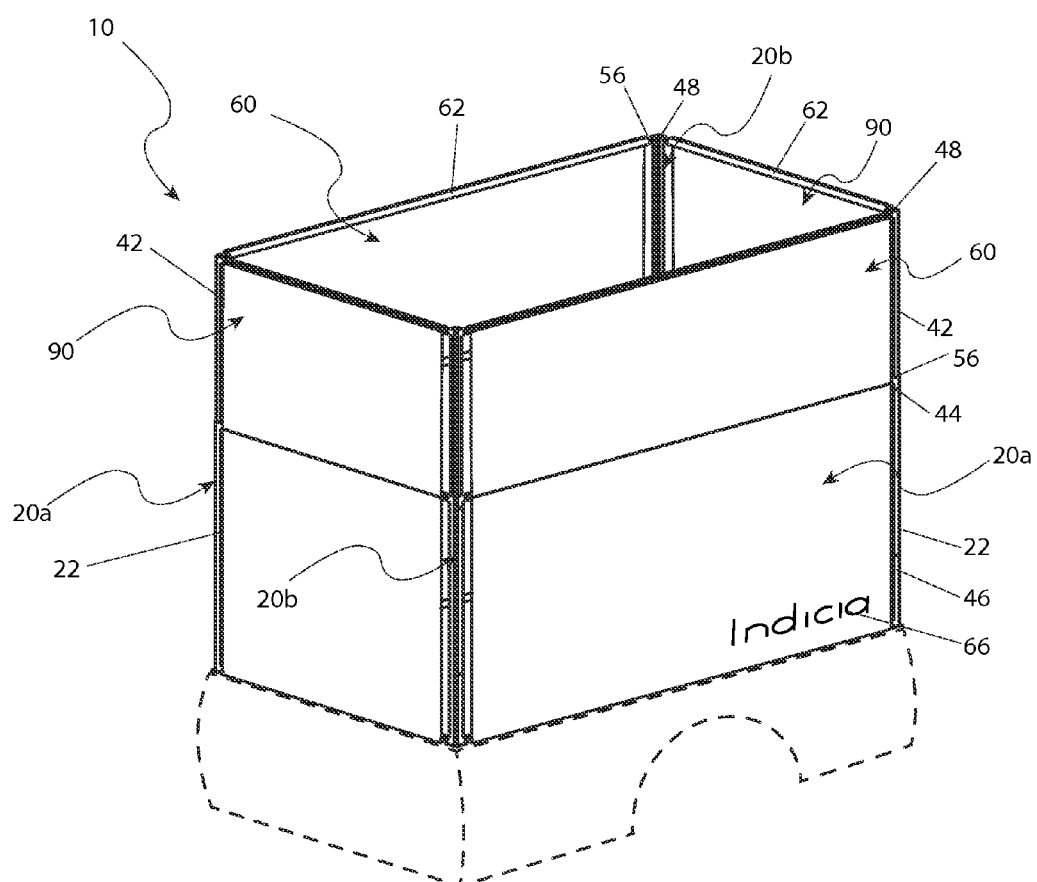
FIG. 1 is a perspective view of the disclosed cargo bed cover for a vehicle with an upper portion extended, in accordance with one (1) embodiment of the present invention.

10 cargo bed cover
20*a* first support post 20b second support post
22 first tube
24 pocket insert
26 insert latch
28 latch button
32 latch spring
34 latch aperture
36 pocket plate
38 notch
42 second tube
44 pin
46 pin aperture
48 top plate
49 loop
52 third tube
54 fourth tube
56 outer retaining clip
57 inner retaining clip
58 clip aperture
60 side panel
62 cable tunnel
66 indicia
70a side cable assembly
70b end cable assembly
72 first cable
74 second cable
76 cable retainer
78 tensioning spring
80 hook-and-loop fastener
82 loop fastener
84 hook fastener
88 spring clip
90 end panel
100 top panel
102 canopy
104 crown
106 post covers
108 wear patch
112 spring clip
114 flex rod
116 rod guide
118 rod pocket
120 rear panel
122 retainer
124 interior face
126 exterior face
128 center opening
132 first flap
134 second flap
136 keeper tab
140 screen panel
142 end screen
144 side screen
200 stake pocket

DETAILED DESCRIPTION OF THE PREFERRED EMBODIMENT

In accordance with the invention, the best mode is presented in terms of a one or more of the disclosed embodiments, herein depicted within FIGS. 1 through 10. However, the disclosure is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

As used herein, the terms "first", "second", "third", etc. are used as labels to describe various elements, features, and/or components, and are not intended to impose ordinal, positional, or hierarchical requirements on the referenced items, unless other indicated. For example, such terms may be used to distinguish one (1) element from another element.

As used herein, relative terms such as "top", "bottom", "below", "above", "upper", "lower", "horizontal", or "vertical" are used to describe a relationship of one (1) element, feature and/or region to another element, feature and/or region as illustrated in the figures.

Referring to FIGS. 1-10, disclosing a cargo bed cover apparatus (herein referred to as the "apparatus") 10 for a cargo bed area of a vehicle, such as a pick-up truck, where like reference numerals represent similar or like parts. Generally, in one (1) example embodiment, the disclosed apparatus 10 provides a pair of side panels 60 and a pair of end panels 80 attached to a plurality of first support posts 20a and second support posts 20b that form a protective barrier around the cargo bed of a pick-up truck in order to keep any items contained therein confined and shielded from road dirt. In another example embodiment, the apparatus 10 provides an additional top panel 90 that extends the protective barrier to include overhead protection from direct sun exposure or inclement weather. In yet another example embodiment, the apparatus 10 provides a plurality of screen panels 120 that can be utilized for ventilation when the vehicle is stationary.

It is understood that since some variation in the dimensions of cargo beds exists among different pick-up truck models that there must be a plurality of sizes implicit in the example embodiments of the disclosed apparatus 10 without limiting the scope of the present disclosure.

As used herein, the terms "front" and "back" or "rear" are used relative to the front and back/rear directions of the vehicle to which the disclosed apparatus 10 may be attached, whereas the terms "right" and "left" are used relative to the operator of the vehicle positioned in the driver's seat.

Referring to FIG. 1, one embodiment of the disclosed apparatus 10 includes a pair of first support posts 20a and a pair of second support posts 20b, each capable of being inserted and secured into the stake pockets 200 (FIG. 2c) of a cargo bed of a pick-up truck, a pair of flexible side panels 60, and a pair of flexible end panels 80 attached to the posts 20a, 20b.

The first support posts 20a and the second support posts 20b are configured to be mirror images of each other. Each first support post 20a includes a first (e.g., lower) tube 22 and a second (e.g., upper) tube 42, which are preferably composed of square metal tubes having the appropriate cross-sectional dimensions for a lower end of the first tube 22 to be accommodated within a pick-up truck cargo bed stake pocket 200 and for the second tube 42 to be accommodated within an upper portion of the first tube 22 with a sliding fit.

The second support posts 20b is similarly configured to have a third (e.g., lower) tube 52 of the same size and cross-section as the first tube 22 capable of fitting within a stake pocket 200 and a fourth (e.g., upper) tube 54 of the same size and construction as the second tube 42 capable of fitting within the third tube 52.

The first tube 22, the second tube 42, the third tube 52, and the fourth tube 54 are preferably composed of aluminum in order to advantageously exploit the lower density and lighter weight of that material in comparison with some other metals; however, other materials may be utilized without limiting the scope of the apparatus 10. The second tubes 42 and the fourth tubes 54 are closed at the top by the attachment of top plates 48. The top plate 48 is configured to be a square plate with rounded or chamfered corners, of the same constituent material as the second tube 42, fastened, preferably by welding, to the inner walls of the second tubes 42 and the fourth tubes 54.

The second tube 42 and the fourth tube 54 are constrained at a full height relationship within the first tube 22 and in the third tube 52, respectively, by means of a pin 44 inserted through aligned pin apertures 46 in each of the tubes 22, 42, 52, and 54. The pin 44 is preferably an "L"-shaped cylindrical rod having sufficient shear strength to maintain the first support posts 20a and the second support posts 20b in the expanded configuration, as illustrated in FIG. 1. The pin 44 may be provided with any of a variety of mechanisms, such as a spring loaded retention ball, to hold the pin 44 in the pin apertures 46. When the pin 44 is removed from the pin apertures 46 of the first support post 20a, the second tube 42 can be lowered to wholly fit within the first tube 22. In this configuration the pin aperture (not shown) in the second tube 42 will preferably be in alignment with another pin aperture 46 located at a lower elevation in the first tube 22 and the pin 44 can be reinserted for storage. The second support post 20b can be shortened in a similar manner.

Figure 2A:
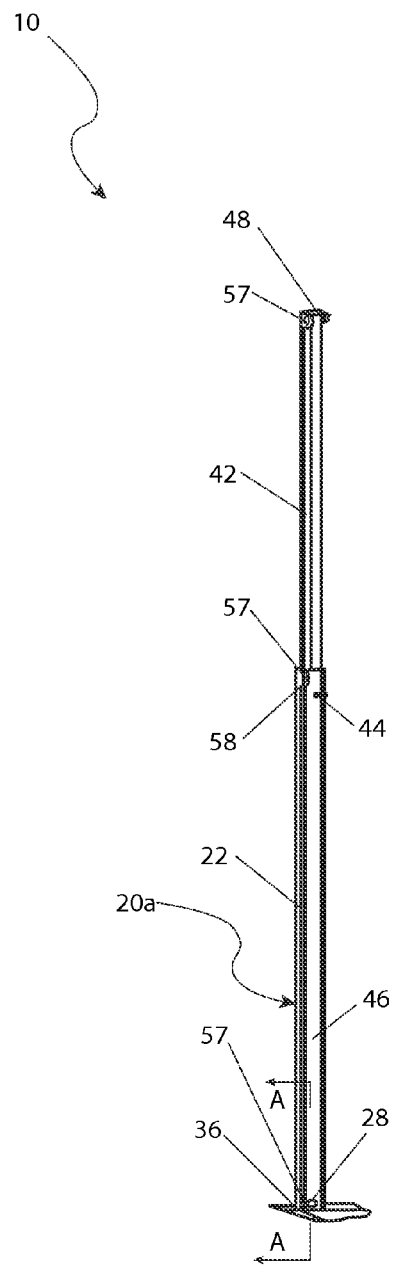
FIG. 2*a* is a perspective view of a first support post of the disclosed cargo bed cover, in accordance with one (1) embodiment of the present invention.
Figure 2B:
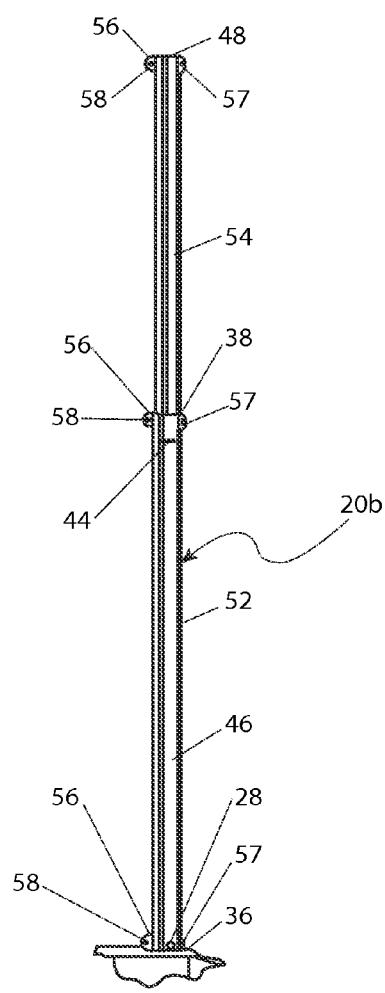
FIG. 2*b* is a perspective view of a second support post of the disclosed cargo bed cover, in accordance with one (1) embodiment of the present invention.

Referring to FIGS. 2a and 2b, the first tube 22 and the third tube 52 may be modified at the lower ends, such as by the incorporation of additional plates or other material, to have a pocket insert 24 that would conform to the dimensions of the stake pocket 200 and could more easily be accommodated therein. The upper ends of the first tube 22 and the third tube 52 would remain unmodified to facilitate the insertion of the second tube 42 within the first tube 22 and of the fourth tube 54 within the third tube 52.

Figure 2C:
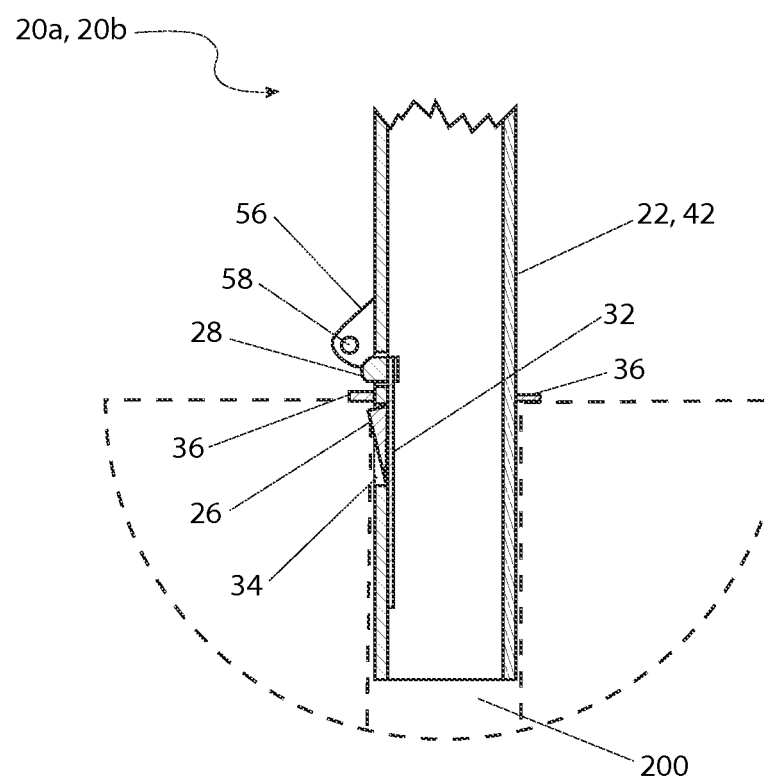
FIG. 2*c* is a partial section view of the first support post taken along line A-A of FIG. 2*a*.

The lower ends of the first tube 22 and the third tube 52 would also be configured to include an insert latch 26 in each to keep the pocket insert 24 retained within the stake pocket 200, as illustrated in FIG. 2c. The insert latch 26 would preferably be some projection from the pocket insert 24, through a latch aperture 34 in the side of the tube 22, 52 oriented toward the cargo bed, to be held in position by a latch spring 32. The insert latch 24 would be disengaged by depressing a latch button 28 in order for the respective first tube 22 or third tube 52 to be released from the stake pocket 200.

A pocket plate 36 is attached to each of the first tube 22 and the third tube 52, preferably by welding, at a point just above the pocket insert 24 in order to limit the insertion of each tube 22, 52 into the stake pockets 200. The pocket plate 36 is preferably configured to be a flat plate having length and width dimensions somewhat larger than those of the stake pocket 200 and an aperture (not shown) that would accommodate the profile of the first tube 22 and the third tube 52.

An outer retaining clip 56 is attached, preferably by welding, to a lower end of a first tube 22. The outer retaining clip 56 is generally a triangular-shaped plate provided with a centrally located clip aperture 58 for the insertion of a spring clip 88. The outer retaining clip 56 is attached in proximity to and above the pocket plate 36 to that face of the first tube 22, which is oriented toward the third tube 52 along the longitudinal axis of the vehicle, and further, the outer retaining clip 56 is planar to that face of the first tube 22, which is opposite from the cargo bed at a side thereof.

An inner retaining clip 57, configured to be similar to the outer retaining clip 56, is attached to the same first tube 22 in proximity to and above the pocket plate 36 on a face of that first tube 22, which is oriented toward the third tube 52 along the transverse axis of the vehicle, and further, the inner retaining clip 57 is planar to that face of the first tube 22, which is opposite from the cargo bed at an end thereof and oriented perpendicular to the outer retaining clip 56.

Another outer retaining clip 56 and inner retaining clip 57 are attached to the first tube 22 in proximity to the upper end thereof and in the same orientation as the previously discussed outer retaining clip 56 and inner retaining clip 57.

A third outer retaining clip 56 and a third inner retaining clip 57 are attached at an upper end of the second tube 42; the second tube 42 being fitted into the first tube 22. This third outer retaining clip 56 and inner retaining clip 57 are oriented in the same manner as the previously discussed outer retaining clips 56 and inner retaining clips 57.

As previously stated, the second support post 20b is a mirror image of the first support post 20a; therefore, the three (3) outer retaining clips 56 and the three (3) inner retaining clips 57 disposed on the third tube 52 and the fourth tube 54 are configured in a mirrored fashion, as illustrated in FIG. 2a.

Disposed at an upper end of each first tube 22 and each third tube 52 is a pair of notches 38 in proximity to the outer retaining clip 56 and the inner retaining clip 57. These notches 38 are sized to accommodate the insertion of the outer retaining clip 56 and the inner retaining clip 57 attached to the upper ends of the second tube 42 and the fourth tube 54 when the upper portion of the apparatus 10 is collapsed, as illustrated in FIG. 4, and the second tube 42 is stored within the first tube 22 and the fourth tube 54 is stored within the third tube 52.

Referring to FIG. 3a, the side panels 60 are preferably composed of a rectangular sheet of canvas and provided with a hem on all sides to prevent raveling. The canvas may be further treated to inhibit the absorption of water. Other materials, such as a reinforced polymer sheeting, may be utilized without limiting the scope of the apparatus 10.

Disposed on an interior surface of the side panels 60 is a plurality of cable tunnels 62 corresponding to the points of attachment to the support posts 20a, 20b. The cable tunnels 62 are configured to be strips of canvas, or other material utilized in the side panel 60, doubled over and stitched, or otherwise fastened, to the length of the side panel 60. The side panels 60 are configured to be installed along the longitudinal axis of the vehicle on either side of the cargo bed.

The end panels 90 are similar in construction to the side panels 60 with some variation possible in the length thereof. The end panels 90 are configured to be installed along the lateral axis of the vehicle at the front and the rear of the cargo bed.

A side cable assembly 70a is routed through each of the cable tunnels 62 attached to the side panels 60 while an end cable assembly 70b is routed through each of the cable tunnels 62 in the end panels 90. The side cable assembly 70a and the end cable assembly 70b each consist of a tensioning spring 78 to which a first cable 72 and a second cable 74 are attached.

Referring to FIG. 3c, the tensioning spring 78 is configured to be a coiled tension spring with a closed eye 82 at either end. The first cable 72 is attached at a first end of the tensioning spring 78 by passing a first end of the first cable 72 through the closed eye 82, forming a loop 84 in the first cable 72 with the eye 82 captured therein, and securing the loop 84 with a cable retainer 76. The cable retainer 76 is preferably a malleable metal ring that can be deformed around the loop 84 ends of the first cable 72 thereby affixing the loop 84.

Referring to FIG. 3b, a spring clip 88, also known as a carabiner, is attached in a loop 84 with a cable retainer 76 at a second end of the first cable 72. The second cable 74 is similarly attached to a second end of the tensioning spring 78 with another spring clip 88 attached in a loop 84 at a second end of the second cable 74. The spring clips 88 are then fastened into the clip aperture 58 of the appropriate outer retaining clip 56, or inner retaining clip 57, attached to a first support post 20a, or a second support post 20b, in order to suspend the side panels 60, or the end panels 90, on the apparatus 10. The purpose of the tensioning spring 78 connecting the first cable 72 and the second cable 74 is to keep the cable assembly 70a, 70b taut while suspended between the respective retaining clips 56, 57. The sequence followed in the connection of spring clips 88 to outer retaining clips 56 or to inner retaining clips 57 is herein stated for clarity and should not be seen as limiting the scope of the apparatus 10.

It is envisioned that some surface portions of one (1), or both, side panels 60 may contain various indicia 66, which may provide script or logos based upon a marketing preference and may include images such as, but not limited to, a product logo, preferred product assembly or use instructions, symbols, lines, pictures, and the like, in various colors and patterns, to further customize the apparatus 10.

Referring to FIG. 4, a collapsed configuration of the apparatus 10 can be achieved because of the preferred method of construction presented herein. The procedure for assembling the apparatus 10, as illustrated in FIG. 4 would be to install a first tube 22 into the front stake pocket 200 on the right side of the cargo bed by placing the pocket insert 24 into the stake pocket 200 and engaging the insert latch 26. Then installing the pocket insert 24 of another first tube 22 unto the rear stake pocket 200 on the left side of the vehicle and engage the insert latch 26. Then installing a third tube 52 into each of the remaining two (2) front and rear stake pockets 200 and engage the insert latch 26. Then installing a second tube 42 entirely into each of the first tubes 22 aligning the outer retaining clip 56 and the inner retaining clip 57 at the upper end of each second tube 42 with the notches 38 in the upper ends of the first tubes 22 and insert the pins 44 into the aligned pin apertures 46.

The outer retaining clip 56 at the upper end of the second tube 42 will be side-by-side with the outer retaining clip 56 at the upper end of the first tube 22 and the two (2) clip apertures 58 will be in alignment. The same condition will exist for the inner retaining clip 57 at the upper end of the first tube 22 and the inner retaining clip 57 at the upper end of the second tube 42. The same procedure is used to install the fourth tubes 54 into the third tubes 52.

A side panel 60 is unfolded and a side cable assembly 70a is threaded into each of the lower two (2) cable tunnels 62. A spring clip 88 attached to the first cable 72 of the bottom-most side cable assembly 70a is connected into the lowest outer retaining clip 56 attached to the first tube 22 located on the right side of the cargo bed by displacing the throat latch of the spring clip 88 and inserting the open hook into the clip aperture 58 making certain that the cable tunnel 62 is oriented toward the cargo bed.

The spring clip 88 is constructed such that the spring biased throat latch will close upon the open hook when the throat latch is released.

The tensioning spring 78 of the bottom-most side cable assembly 70a is expanded by exerting a tension force upon the second cable 74 (e.g., pull the second cable 74 away from the first cable 72) and connecting the spring clip 88 attached to that second cable 74 into the clip aperture 58 of the lowest outer retaining clip 56 attached to the third tube 52 located on the right side of the cargo bed. Connect the spring clip 88 attached to the first cable 72 of the side cable assembly 70a, which is inserted into the middle cable tunnel 62 of the side panel 60 into the top outer retaining clip 56 attached to the first tube 22 and then into the outer retaining clip 56 attached to the second tube 42 located on the right side of the cargo bed by displacing the throat latch of the spring clip 88 and inserting the open hook first into one (1) clip aperture 58 and then the other clip aperture 58 again keeping the cable tunnel 62 oriented toward the cargo bed. Expand the tensioning spring 78 of the side cable assembly 70a in the middle cable tunnel 52 by exerting a tension force upon the second cable 74 and connect the spring clip 88 attached to that second cable 74 into the clip aperture 58 of the upper-most outer retaining clip 56 attached to the third tube 52 and then into the clip aperture 58 of the outer retaining clip 56 attached to the upper end of the fourth tube 54 located on the right side of the cargo bed.

The remainder of the side panel 60 not presently supported by attachment to the first support post 20a and the second support post 20b will be folded over toward the cargo bed to hang freely. Provisions could be made to attach the unsupported upper portion of the side panel 60 to a location along the lower, supported portion of the same side panel 60 by the inclusion of tie straps or by other means of fastening, such as hook-and-loop fasteners 80.

The attachment of a side panel 60 on the left side of the cargo bed, as well as the attachment of end panels 90 can be achieved with the utilization of similar side cable assemblies 70a and end cable assemblies 70b engaged in outer retaining clips 56, or inner retaining clips 57, in a manner detailed in the previous discussion.

Referring to FIG. 5, in another example embodiment of the disclosed apparatus 10 includes a top panel 100 with some attachment means, such as hook-and-loop fasteners 80 (e.g., VELCRO®) to the apparatus 10. The first support posts 20a and the second support posts 20b are modified to include a loop 49 (FIG. 6b) attached to the top of second tubes 22 and to the fourth tubes 54. The loop 49 is preferably configured to be an elliptical metal ring disposed in the same plane as the top plate 48 and attached along some portion of the periphery so as to project toward the interior of the cargo bed. Other embodiments of the loop 49 may take on other shapes, such as circular, or circular with a projecting shank or stem, without limiting the scope of the apparatus 10.

The side panels 60 include strip segments of a hook fastener 84 of a hook-and-loop fastener 80 attached along the side and top edges of the exterior surface. A single end panel 90, positioned along the front of the cargo bed, is utilized in this example embodiment. This end panel 90 is adapted to include strip segments of a hook fastener 84 of a hook-and-loop fastener 80 attached along the side and top edges of the exterior surface much the same as the side panels 60.

In another example embodiment, a rear panel 120 configured to be positioned along the rear edge of the cargo bed is substituted for the previously supported end panel 90. The rear panel 120 is preferably longer than an end panel 90 by an amount approximately equivalent to the depth of the cargo bed. This configuration allows the rear panel 120 to contact the bottom of the cargo bed and still provide a cover for the rear of the cargo bed when the pick-up tailgate is lowered. The rear panel 120 is provided with a single cable tunnel 62 in proximity to the top of the interior face 126 corresponding to the points of attachment to the inner retaining clip 57 at the top of the second support post 20b on the right, rear corner of the cargo bed and the inner retaining clip 57 at the top of the first support post 20a on the left, rear corner of the cargo bed.

An end cable assembly 70b is threaded through the cable tunnel 62 attached to the rear panel 120 and attached in the inner retaining clips 57. Additional spring clips 88 are attached, by means of retainers 122, to the interior face 126 of the rear panel 120 along either side at locations that correspond to the attachment points of the inner retaining clips 57 on the upper and lower ends of the first tube 22 and the third tube 52. The retainers 122 are preferably configured to be strips of canvas, or other constituent material of the rear panel 120, stitched at a first end and at a second end to the interior face 126 of the rear panel 120 with a spring clip 88 captured between the retainer 122 and the material of the rear panel 120. The spring clips are then attached to the inner retaining clips 57 to secure the rear panel 120 to the first support post 20a and the second support post 20b. The lower end of the rear panel 120 could be provided with magnets sewn into a hem in order to hold that edge in contact with the bottom surface of the cargo bed.

The rear panel 120 would be provided with strip segments of a hook fastener 84 of a hook-and-loop fastener 80 attached along the side and top edges of the exterior face 124.

Figure 6A:
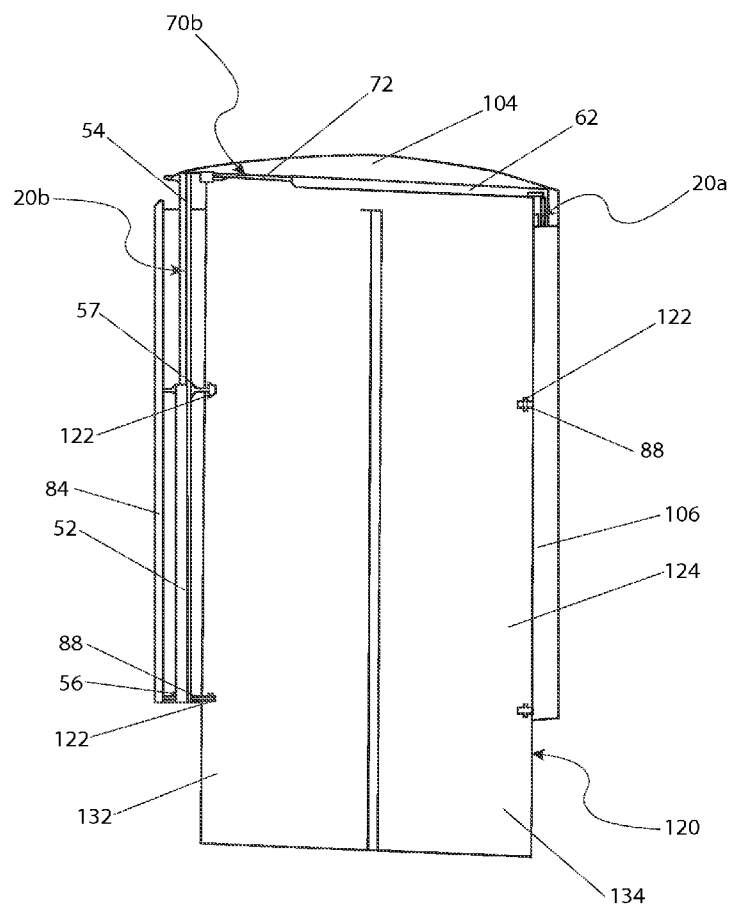
FIG. 6*a* is side view of an interior face of a rear panel of the disclosed cargo bed cover, in accordance with one (1) embodiment of the present invention.
Figure 6B:
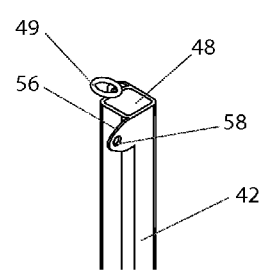
FIG. 6*b* is a partial perspective view of a loop affixed to a top plate of a support post of the disclosed cargo bed cover, in accordance with one (1) embodiment of the present invention.

The rear panel is preferably configured to have a center opening 128, as illustrated in FIG. 6a. The center opening 128 would be an overlapping of the hemmed material of a first flap 132 onto a proportionally equal second flap 134 of the rear panel 120, which would provide an opening to permit the ingress and egress of a user to the interior of the cargo bed. The center opening 128 could be provided with a closure to selectively limit the ingress of nuisance insects, dust, or the like to promote a more hospitable environment within the enclosure. The closure could take the form of fabric ties or strips of hook-and-loop fasteners 80 located along some portion of the hemmed edges.

Figure 7:
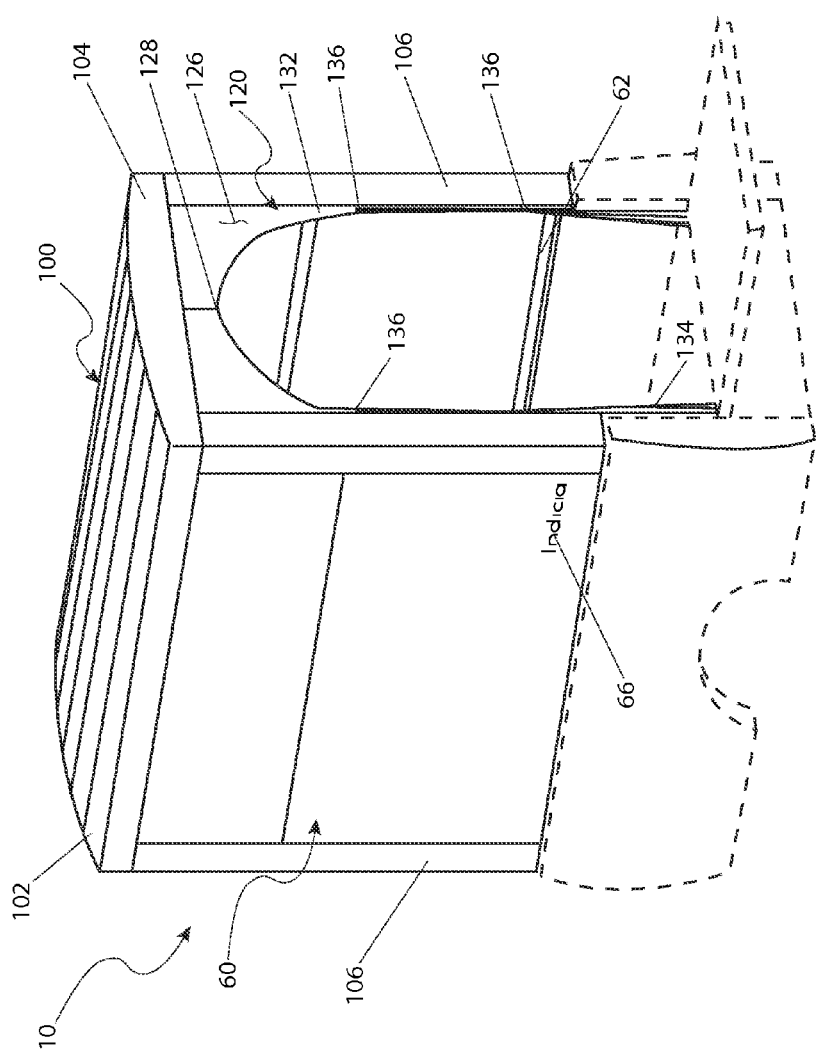
FIG. 7 is a perspective view of an exterior face of the rear panel of the disclosed cargo bed cover, in accordance with one (1) embodiment of the present invention.

The rear panel 120 is provided with at least one (1) keeper tab 136 to retain the material of the first flap 132, or of the second flap 134, at a position in closer proximity to the support post 20a or 20b located on that side of the center opening 128, as illustrated in FIG. 7. A plurality of keeper tabs 136 may also be utilized to gather the first flap 132 and the second flap 134 to that respective side of the center opening 128 in order to provide a wider passageway through the rear panel 120. The keeper tab 136 is configured to be a strip of canvas, or other constituent material of the rear panel 120, attached at a first end, preferably by stitching, to some point along the interior face 126 near an edge of the rear panel 120 with a segment of a loop fastener 82, or a hook fastener 84, disposed at a second end thereof. The material of the subject flap 132, 134 would be gathered toward that respective side of the cargo bed and the keeper tab 136 would be manipulated to encircle the gathered material to ultimately have the segment of hook-and-loop fastener 80 disposed at the second end of the keeper tab 136 be engaged with a complimentary segment of hook-and-loop fastener 80 attached to the exterior face 126 of the rear panel 120. In the event that plurality of keeper tabs 136 is provided on the rear panel 120, a user could selectively engage multiple keeper tabs 136 to secure a passageway.

Figure 8:
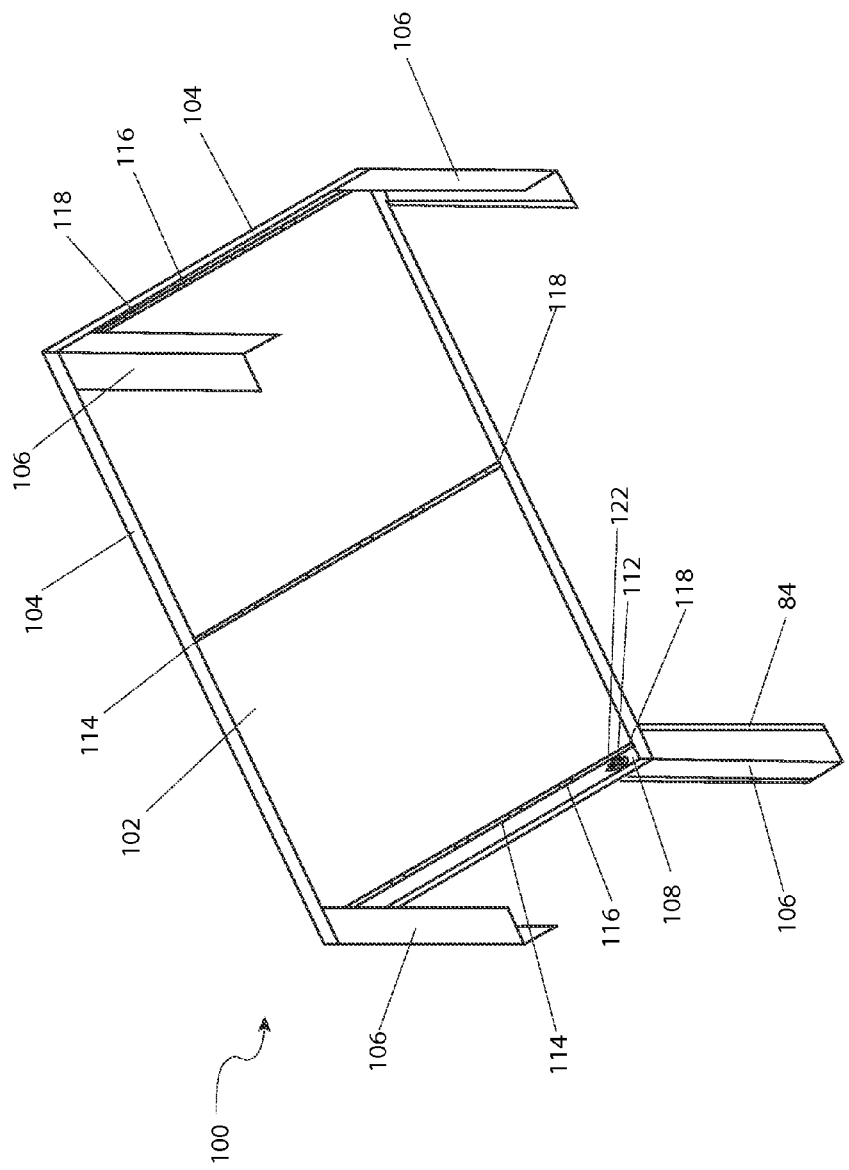
FIG. 8 is a perspective view of a top panel of the disclosed cargo bed cover, in accordance with one (1) embodiment of the present invention.

Referring to FIG. 8, the top panel 100 includes a canopy 102 with a crown 104, and a plurality of post covers 104. The top panel 100 is preferably composed of a plurality of pieces of a canvas material stitched together to form a single piece provided with a hem along all edges to prevent raveling. The canvas may be further treated to inhibit the absorption of water. Other materials, such as reinforced poly sheeting, may be utilized without limiting the scope of the apparatus 10.

Disposed in each of the four (4) corners of an interior side of the canopy 102, in alignment with the upper ends of the support posts 20a, 20b, is a wear patch 108. The purpose of the wear patch 108 is to reduce the likelihood of having any of the support posts 20a, 20b wear a hole into the material of the top panel 100 due to vibration or any other relative motion between the support posts 20a, 20b and the canopy 102. The wear patch 108 is composed of a material having improved abrasion resistance in comparison to the material utilized in the top panel 100, such as leather or a rubber, or rubber-like, compound. The wear patch 108 could also be a plurality of layers of the same, or similar, material as the canopy 102 without limiting the scope of the apparatus 10.

Also disposed upon the interior surface of the top panel 100, in proximity to each of the wear patches 108, are four (4) spring clips 112. The spring clips 112 are located such that when the top panel 100 is assembled properly onto the apparatus 10 the spring clips 112 will be in alignment with the loops 49 on each of the support posts 20a, 20b and can be connected to secure the top panel 100 in place. The spring clips 112 are preferably attached to the interior of the canopy 102 in much the same manner as the spring clips 88 are attached to the end panel 120, with retainers 122.

The canopy 102 is fitted with a plurality of flex rods 114 that are longer than the width of the top panel 100 such that when the flex rods 114 are inserted into a row of aligned rod guides 116 and into the rod pockets 118, the canopy 102 will be formed as a convex dome so as to resist the puddling of rain water thereon. Preferably, one (1) flex rod 114 will be located near the front end of the canopy 102 while another flex rod 114 will be located near the rear of the canopy 102 and all other flex rods 114 will be located in an evenly spaced pattern between the front and the rear.

The flex rods 114 are preferably flexible, fiberglass rods of a uniform diameter. It is understood that other materials may be utilized, such as other composite materials with high flexural strength, without limiting the scope of the apparatus 10.

The rod guides 116 are configured to be a plurality of canvas sleeves, or other material utilized in the fabrication of the canopy 102, attached to the canopy 102 in rows on some uniform pattern along a lateral axis to contain the flex rods 114 in a manner to affect the intended convex arch. The rod pockets 118 are configured to be closed sleeves located at the longitudinal sides of the canopy 102 so as to capture and constrain the ends of the flex rods 114 in a manner which would cause the flex rods 114 to bow upwardly.

The top panel 100 is provided with a crown 104 that will include any vertical surface of the top panel superjacent to a post cover 106. The crown 104 at the front and the rear of the cargo bed is generally semi-circular due to the arch in the canopy 102. Some vertical surface will be presented along the longitudinal sides of the canopy 102 due to configuring the top panel 100 to overlap the side panels 60 in order to form the preferred attachment.

A strip segment of loop fastener 82 of a hook-and-loop fastener 80 will be disposed along the interior surface of the crown 104 in proximity to a lower edge thereof in order to engage the complimentary hook fastener 84 segments at the top edges of the side panels 60, the end panel 90, and the rear panel 120.

The post covers 106 of the top panel 100 are each configured to be a corner piece of material with a first vertical planar portion being perpendicular to a second vertical planar portion. As previously mentioned the post covers 106 are connected to the top cover subjacent to the crown 104. A strip segment of loop fastener 82 of a hook-and-loop fastener 80 is disposed along the interior surface of each vertical planar portion of the post covers 106 in proximity to that edge that is opposite from the included angle. The loop fastener 82 segments on the faces of each post cover 106 will engage into the complimentary hook fastener 84 segments disposed along the side edges of the side panels 60, the end panel 90, and the rear panel 120.

Figure 9:
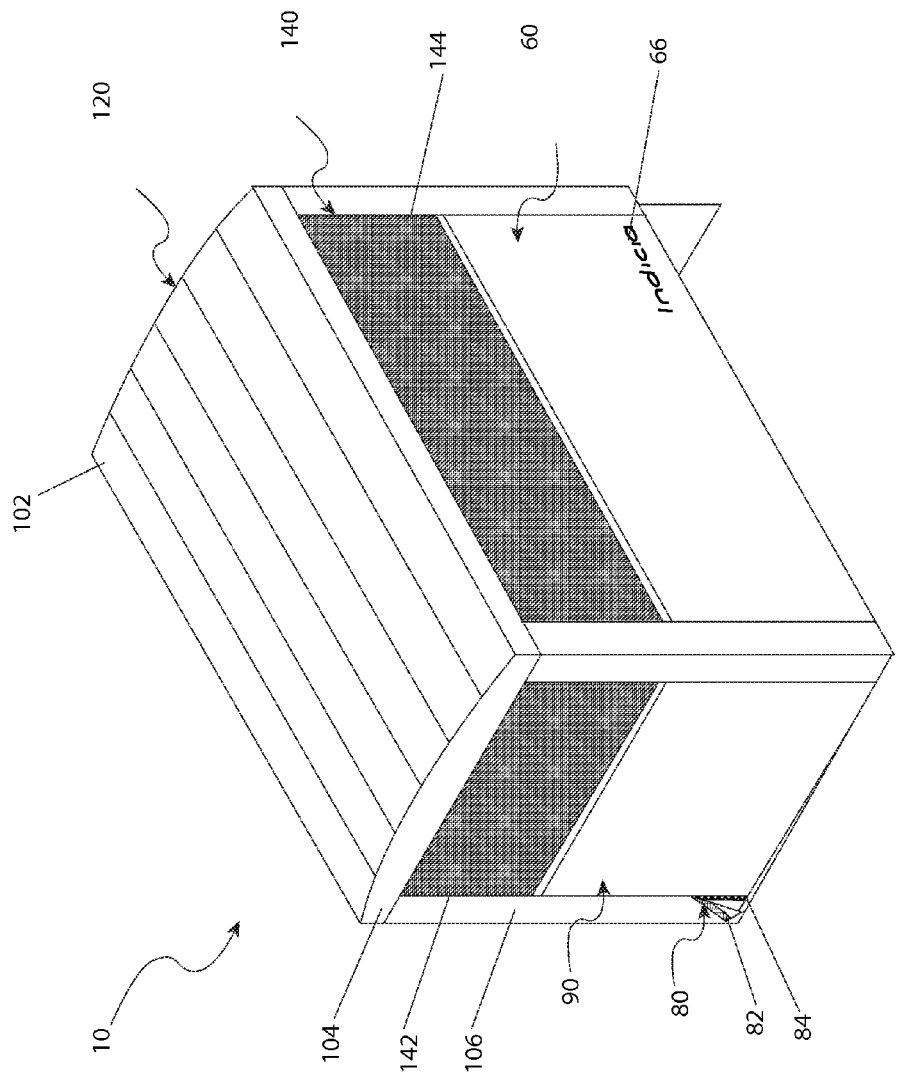
FIG. 9 is a perspective view of the disclosed cargo bed cover, in accordance with one (1) embodiment of the present invention; and, FIG. 10 is a side view of a ventilation screen panel of the disclosed cargo bed cover of FIG. 9, in accordance with one embodiment of the present invention.

Referring to FIG. 9, in another example embodiment, the disclosed apparatus 10 includes a screen panels 140 with some attachment means, such as hook-and-loop fasteners 80 (e.g., VELCRO®). Additional segments of a hook fastener 84 of a hook-and-loop fastener 80 would be attached along the exterior surfaces of the end panel 90 and each of the side panels 60 at a location corresponding to just under the middle cable tunnel 62.

Figure 10:
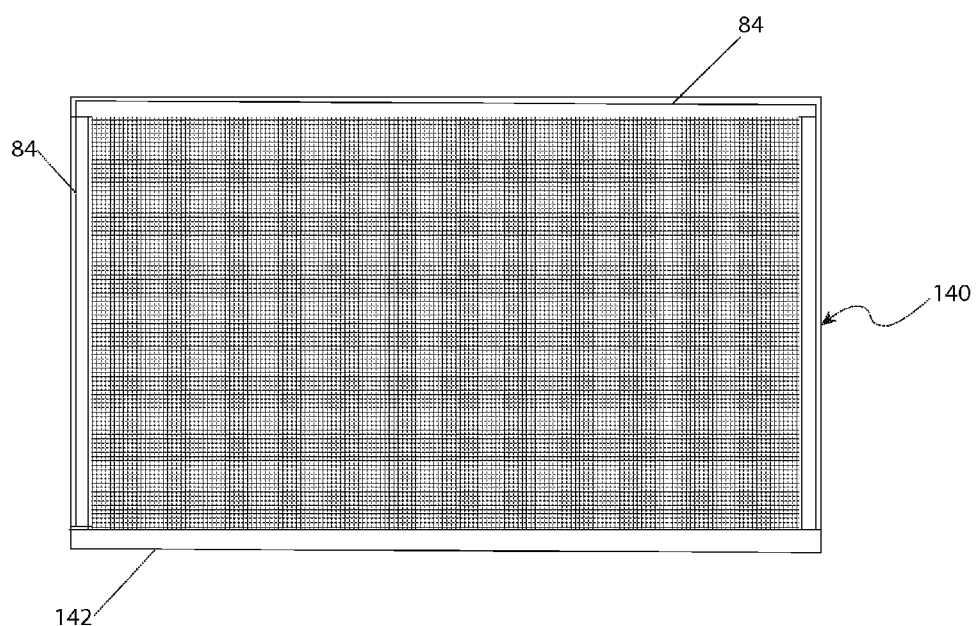

The screen panels 140 are configured to be an open mesh, woven polymer fabric utilizing a large gauge filament and provided with a wide canvas hem, as illustrated in FIG. 10. It is understood that other materials and other configurations may be utilized without limiting the scope of the apparatus 10.

Strip segments of a hook fastener 84 of a hook-and-loop fastener 80 would be attached along the exterior surfaces of the side hems and the upper hem of each screen panel 140. A strip segment of a loop fastener 82 is attached along the interior surface of the bottom hem of each screen panel 140. An end screen 142 would be used to replace an upper portion of the end panel 140 located the front of the cargo bed while side screens 144 would be used to replace an upper portion of the side panels 60. The upper side cable assemblies 70a on each side of the cargo bed would be detached from the upper outer retaining clips 56 and, after releasing all of the hook-and-loop fasteners 80 securing the top portion of the side panels 60 to the top panel 100, the upper portion of each side panel 60 would be folded down toward the interior of the cargo bed. The side screens 144 could then be installed and secured with the hook-and-loop fasteners 80 to the top panel 100 and to the side panels 60.

Similarly, the upper end cable assembly 70b on the end panel at the front of the cargo bed would be detached from the inner retaining clips 57 and, after releasing all of the hook-and-loop fasteners 80 securing the top portion of the end panel 90 to the top panel 100, the upper portion of the end panel would be folded down toward the interior of the cargo bed. The end screen 142 could then be installed and secured with the hook-and-loop fasteners 80 to the top panel 100 and to the end panel 90.

Provisions could be made to attach the unsupported upper portion of the side panel 60 and of the end panel 90 to a location along the lower, supported portion of the same panel 60, 90 by the inclusion of tie straps or by other means of fastening, such as hook-and-loop fasteners 80.

Those skilled in the art will recognize that other styles and configurations of the disclosed apparatus 10 can be easily incorporated into the teachings of the present disclosure, and only particular configurations have been shown and described for purposes of clarity and disclosure and not by way of limitation of scope.

The example embodiments of the disclosed apparatus can be utilized by the user in a simple and effortless manner with little or no training. After initial purchase or acquisition of the apparatus 10, it would be installed as indicated in FIGS. 1-4.

One example of the disclosed method for installing and utilizing the apparatus 10 may be achieved by performing the following steps: acquiring a model of the apparatus 10 having a desired size to be accommodated on the user's vehicle; installing a first tube 22 into the front stake pocket 200 on the right side of the cargo bed by placing the pocket insert 24 into the stake pocket 200; engaging the insert latch 26; installing the pocket insert 24 of another first tube 22 unto the rear stake pocket 200 on the left side of the vehicle; engaging the insert latch 26; installing a third tube 52 into each of the remaining two (2) front and rear stake pockets 200; engaging the insert latch 26; installing a lower end of a second tube 42 into an upper end of each of the first tubes 22 aligning the outer retaining clip 56 and the inner retaining clip 57 at the upper end of each second tube 42 with the outer retaining clip 56 and the inner retaining clip 57 at the upper ends of the first tubes 22; inserting the pins 44 into the aligned pin apertures 46; installing a lower end of a fourth tube 54 into an upper end of each of the third tubes 52 aligning the outer retaining clip 56 and the inner retaining clip 57 at the upper end of each fourth tube 54 with the outer retaining clip 56 and the inner retaining clip 57 at the upper ends of the third tubes 52; inserting the pins 44 into the aligned pin apertures 46; unfolding a side panel 60; threading a side cable assembly 70a into each of the cable tunnels 62; connecting the spring clip 88 attached to the first cable 72 of the bottom-most side cable assembly 70a into the lowest outer retaining clip 56 attached to the first tube 22 located on the right side of the cargo bed by displacing the throat latch of the spring clip 88; inserting the open hook of the spring clip 88 into the clip aperture 58 of the outer retaining clip 56 making certain that the cable tunnel 62 is oriented toward the cargo bed; expanding the tensioning spring 78 of the bottom-most side cable assembly 70a by exerting a tension force upon the second cable 74; connecting the spring clip 88 attached to that second cable 74 into the clip aperture 58 of the lowest outer retaining clip 56 attached to the third tube 52 located on the right side of the cargo bed; connecting the spring clip 88 attached to the first cable 72 of the side cable assembly 70a, which is inserted into the middle cable tunnel 62 of the side panel 60, into the top outer retaining clip 56 attached to the first tube 22 located on the right side of the cargo bed by displacing the throat latch of the spring clip 88; inserting the open hook of the spring clip 88 into the clip aperture 58, again keeping the cable tunnel 62 oriented toward the cargo bed; expanding the tensioning spring 78 of the side cable assembly 70a in the middle cable tunnel 52 by exerting a tension force upon the second cable 74; connecting the spring clip 88 attached to that second cable 74 into the clip aperture 58 of the upper-most outer retaining clip 56 attached to the third tube 52 located on the right side of the cargo bed; connecting the spring clip 88 attached to the first cable 72 of the upper-most side cable assembly 70*a* into the upper outer retaining clip 56 attached to the second tube 22 located on the right side of the cargo bed; expanding the tensioning spring 78 of the upper-most side cable assembly 70*a*; connecting the spring clip 88 attached to that second cable 74 into the clip aperture 58 of the upper outer retaining clip 56 attached to the fourth tube 54 located on the right side of the cargo bed; repeating the procedure for the installation of side cable assemblies 70*a* into the side panel 60 on the opposite side of the cargo bed; repeating the procedure for the installation of side cable assemblies 70*a* into the outer retaining clips 56 disposed upon the first support post 20*a* and the second support post 20*b* on that opposite side of the cargo bed; unfolding an end panel 90; inserting end cable assemblies 70*b* into each of the cable tunnels 62 of the end panel 90; connecting the spring clip 88 attached to the first cable 72 of the bottom-most end cable assembly 70*b* into the lowest inner retaining clip 57 attached to the third tube 52 located on the left side of the cargo bed making certain that the cable tunnel 62 is oriented toward the cargo bed; expanding the tensioning spring 78 of the bottom-most end cable assembly 70*b*; connecting the spring clip 88 attached to that second cable 74 into the clip aperture 58 of the lowest inner retaining clip 57 attached to the first tube 22 located on the right side of the cargo bed; connecting the spring clip 88 attached to the first cable 72 of the end cable assembly 70*b*, which is inserted into the middle cable tunnel 62 of the end panel 90, into the top inner retaining clip 57 attached to the third tube 52 located on the left side of the cargo bed; inserting the open hook into the clip aperture 58, again keeping the cable tunnel 62 oriented toward the cargo bed; expanding the tensioning spring 78 of the end cable assembly 70*b* in the middle cable tunnel 52 by exerting a tension force upon the second cable 74; connecting the spring clip 88 attached to that second cable 74 into the clip aperture 58 of the upper-most inner retaining clip 57 attached to the first tube 22 located on the right side of the cargo bed; connecting the spring clip 88 attached to the first cable 72 of the upper-most end cable assembly 70*b* into the upper inner retaining clip 57 attached to the fourth tube 54 located on the left side of the cargo bed; expanding the tensioning spring 78 of the upper-most end cable assembly 70*a*; connecting the spring clip 88 attached to the second cable 74 into the clip aperture 58 of the upper inner retaining clip 57 attached to the second tube 42 located on the right side of the cargo bed; repeating the procedure for the installation of end cable assemblies 70*b* into the end panel 90 on the rear of the cargo bed; repeating the procedure for the installation of end cable assemblies 70*b* into the inner retaining clips 57 disposed upon the first support post 20*a* and the second support post 20*b* on the rear of the cargo bed; and placing the desired items into the cargo bed and transporting those items to the desired location.

It can be appreciated that the operational steps may be performed in alternative order and as such any operational description of use should not be viewed as a limiting factor.

The apparatus 10 may be removed from the vehicle by reversing the previous procedure. The method of installing the apparatus 10 to conform to the illustration in FIG. 4 is detailed herein above.

Another example of the disclosed method for utilizing the alternate embodiment of the apparatus 10 may be achieved by performing the following steps: acquiring a model of the apparatus 10 having a desired size to be accommodated on the user's vehicle; following the previously detailed procedure for the installation of first support posts 20*a*, second support posts 20*b*, side panels 60, and a front end panel 90; unfolding the rear panel 120; inserting an end cable assembly 70*b* into the cable tunnel 62 located at the top of the rear panel 120; connecting the spring clip 88 attached to the first cable 72 of the end cable assembly 70*b* into the upper inner retaining clip 57 attached to the second tube 42 located on the left side of the cargo bed; expanding the tensioning spring 78 of the end cable assembly 70*a*; connecting the spring clip 88 attached to the second cable 74 into the clip aperture 58 of the upper inner retaining clip 57 attached to the fourth tube 56 located on the right side of the cargo bed; connecting the spring clips 88, which are attached to the alternate rear panel 120 by means of retainers 122, to the corresponding inner retaining clips 57 of the first tube 22 and of the third tube 52 at the rear of the cargo bed; placing the top panel 100 over the previously installed framework and panels 60, 90, 120; inserting a flex rod 114 from the right side of the cargo bed to the left side thereof through an aligned row of rod guides; inserting the end of the flex rod 114 into the corresponding rod pocket 118 on the left side of the canopy 102; grasping the right side of the canopy at a location in close proximity to the corresponding rod pocket 118 on that side of the canopy 102; forcing the flex rod 114 against the rod pocket 118 at the left side of the canopy 102 so as to cause the center of the flex rod 114 to deflect upwardly thus decreasing the projected length thereof to ultimately insert the unrestrained end of the flex rod 114 into the rod pocket 118 at the right side of the canopy 102; repeating the requisite previous steps necessary to insert any remaining flex rods 114; securing the top spring clips 112 attached to the canopy 102 to the top loops 49 located on the first support posts 20*a* and the second support posts 20*b*; securing the loop fasteners 82 attached to the top panel 100 with the hook fasteners 84 attached to the side panels 60, the end panel 90, and the rear panel 120; placing the desired items into the cargo bed; closing and securing the center opening 128 of the rear panel 120; transporting the selected items and passengers to the intended destination; parking the vehicle; and participating in the desired activities while having the benefit of utilizing the sheltered space within the cargo bed or the items stored therein.

The center opening 128 of the rear panel 120 can be selectively opened, closed, or retained in an open configuration as previously described in order to access the sheltered space within the cargo bed or the items stored therein. The apparatus 10 may be removed from the vehicle by reversing the previous procedure.

Another example of the disclosed method for utilizing the apparatus 10 may be achieved by performing the following steps: acquiring a model of the apparatus 10 having a desired size to be accommodated on the user's vehicle; following the previously detailed procedure for the installation of the apparatus 10 onto the vehicle; detaching the upper side cable assemblies 70*a* on each side of the cargo bed from the upper outer retaining clips 56; releasing all of the hook-and-loop fasteners 80 securing the top portion of the side panels 60 to the top panel 100; folding down the upper portion of each side panel 60 toward the interior of the cargo bed; installing the side screens 144; securing the side screens 144 to the top panel 100 and to the side panels 60 with the hook-and-loop fasteners 80; detaching the upper end cable assembly 70*b* on the end panel at the front of the cargo bed from the inner retaining clips 57; releasing all of the hook-and-loop fasteners 80 securing the top portion of the end panel 90 to the top panel 100; folding down the upper portion of the end panel toward the interior of the cargo bed; installing the end screen 142; securing the end screen 142 to the top panel 100 and to the end panel 90 with the hook-and-loop fasteners 80; and participating in the desired activities while having the benefit of utilizing the ventilated space within the cargo bed or the items stored therein.

The screen panels 140 may be installed at any time prior to departing to the destination or after arriving at the destination. The screen panels 140 may be removed from the device by reversing the previous procedure.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A cargo bed cover apparatus for a vehicle, said apparatus comprising:
   support post assemblies attachable to a cargo bed of said vehicle; and,
   panels extending between and connected to said support posts, each comprising:
      an exterior surface and an opposed interior surface; and,
      cable assemblies connected to said interior surface, extending between and are connected to opposed pairs of said support post assemblies, each further comprising:
         a first cable comprising a first end connected to one support post assembly of said opposed pairs of said support post assemblies and an opposed second end;
         a tensioning spring connected to said second end of said first cable; and,
         a second cable comprising a first end connected to an opposed one support post assembly of said opposed pairs of said support post assemblies and an opposed second end connected to said tensioning spring.

2. The apparatus of claim 1, wherein said panels comprise a flexible textile material.

3. The apparatus of claim 2, wherein said flexible textile material is one of water resistant or waterproof.

4. The apparatus of claim 1, wherein said panels comprise reinforced polymer sheeting.

5. The apparatus of claim 1, wherein said panel further comprises cable tunnels connected to said interior surface, and wherein said cable assemblies extend through and are retained by said cable tunnels.

6. The apparatus of claim 1, wherein each support post assembly comprises:
   a lower tube removably attachable to said cargo bed of said vehicle; and,
   an upper tube slidably connected to and linearly movable relative to said first tube;
   wherein said second tube is height adjustable relative to said first tube.

7. The apparatus of claim 1, further comprising a top panel connected to said support post assemblies and extending between said panels.

8. The apparatus of claim 7, further comprising screen panels connected to and extending between said panels and said top panel.

9. A cargo bed cover apparatus for a vehicle, said apparatus comprising:
   a laterally opposed pair of first support post assemblies removably attachable to a cargo bed of said vehicle;
   a laterally opposed pair of second support post assemblies removably attachable to said cargo bed of said vehicle, said pair of second support assemblies being longitudinally opposed to said pair of first support post assemblies;
   a pair of side panels extending between and connected to longitudinally opposed pairs of said first support post assemblies and said second support post assemblies, each comprising:
      an exterior surface and an opposed interior surface;
      side cable tunnels connected to said side panel interior surface; and,
      side cable assemblies extending through and retained by said side cable tunnels; and
      wherein said side cable assemblies extend between and are connected to said longitudinally opposed pairs of said first support post assemblies and said second support post assemblies; and,
   a pair of end panels extending between and connected to said laterally opposed pairs of said first support post assemblies and said second support post assemblies, each comprising:
      an exterior surface and an opposed interior surface;
      end cable tunnels connected to said end panel interior surface; and,
      end cable assemblies extending through and retained by said end cable tunnels; and,
      wherein said end cable assemblies extend between and are connected to said laterally opposed pairs of said first support post assemblies and said second support post assemblies;
   wherein each first support post assembly and second support post assembly comprises:
      a lower tube comprising a lower end receivably connected within a stake pocket of said cargo bed of said vehicle and an opposed upper end; and,
      an upper tube comprising a lower end receivably connected within said upper end of said lower tube and an opposed upper end;
      wherein said upper tube is linearly movable relative to said lower tube.

10. The apparatus of claim 9, wherein said pair of first support post assemblies and said pair of second support post assemblies are adjustable to one of an extending configuration or a collapsed configuration in response to linear movement of said upper tube relative to said lower tube.

11. The apparatus of claim 10, wherein said pair of side panels and said pair of end panels are longitudinally foldable when said pair of first support post assemblies and said pair of second support post assemblies are adjustable to said collapsed configuration.

12. The apparatus of claim 9, wherein:
   each side cable assembly comprises:
      a first side cable comprising a first end connected to one first support post assembly of said longitudinally opposed pairs of said first support post assemblies and said second support post assemblies and an opposed second end;
      a side cable tensioning spring connected to said second end of said first cable; and,
      a second side cable comprising a first end connected to an opposed second support post assembly of said longitudinally opposed pairs of said first support post assemblies and said second support post assemblies and an opposed second end connected to said side cable tensioning spring; and, each end cable assembly comprises:

a first end cable comprising a first end connected to one first support post assembly or one second support post assembly of said laterally opposed pairs of said first support post assemblies and said second support post assemblies and an opposed second end;

an end cable tensioning spring connected to said second end of said first cable; and, a second end cable comprising a first end connected to an opposed first support post assembly or an opposed second support post of said laterally opposed pairs of said first support post assemblies and said second support post assemblies and an opposed second end connected to said end cable tensioning spring.

13. The apparatus of claim 12, further comprising a top panel removably connected to said pair of first support posts, said pair of second support posts, said pair of side panels, and said pair of end panels.

14. The apparatus of claim 13, wherein said top panel comprises flex rods connected to and extending laterally across an inner surface of said top panel to provide a dome shape thereto.

15. The apparatus of claim 13, further comprising screen panels connected to and extending between said pair of side panels, said pair of end panels, and said top panel.

* * * * *